United States Patent
Septer

(10) Patent No.: US 6,226,919 B1
(45) Date of Patent: May 8, 2001

(54) INSECT VACUUM TRAP

(76) Inventor: Donald R. Septer, 18158 Bracken Cir., Port Charlotte, FL (US) 33948

( * ) Notice: Subject to any disclaimer, the term of this patent is extended or adjusted under 35 U.S.C. 154(b) by 0 days.

(21) Appl. No.: 09/579,483

(22) Filed: May 30, 2000

(51) Int. Cl.$^7$ .................................................. A01M 1/06
(52) U.S. Cl. ............................................................ 43/139
(58) Field of Search .................................. 43/107, 132.1, 43/139, 128; 15/344, 346

(56) References Cited

U.S. PATENT DOCUMENTS

| | | | | |
|---|---|---|---|---|
| 1,445,543 | * | 2/1923 | Nelson | 43/107 |
| 1,611,786 | * | 12/1926 | Serva | 15/346 |
| 1,797,557 | * | 3/1931 | Stine et al. | 43/139 |
| 3,328,827 | * | 7/1967 | Lake et al. | 15/344 |
| 3,330,063 | * | 7/1967 | Lockwood | 43/139 |
| 4,074,458 | * | 2/1978 | Catlett | 43/139 |
| 4,175,352 | * | 11/1979 | Catlett | 43/139 |
| 4,509,650 | * | 4/1985 | Wilgosz | 43/132.1 |
| 4,607,451 | * | 8/1986 | Jarecki | 43/139 |
| 4,794,725 | * | 1/1989 | Numerick | 43/139 |
| 4,918,857 | * | 4/1990 | Wade et al. | 43/139 |
| 5,052,147 | * | 10/1991 | Broomfield et al. | 43/139 |
| 5,060,339 | * | 10/1991 | Evers | 15/344 |
| 5,367,740 | * | 11/1994 | McCray | 15/344 |
| 5,511,281 | * | 4/1996 | Webster | 15/344 |
| 5,722,111 | * | 3/1998 | Sowell et al. | 15/344 |
| 5,970,572 | * | 10/1999 | Thomas | 15/344 |
| 6,108,863 | * | 8/2000 | Lin | 15/346 |

FOREIGN PATENT DOCUMENTS

| | | | | |
|---|---|---|---|---|
| 941660 | * | 9/1991 | (EP) . | |
| 688871 | * | 3/1953 | (GB) | 43/139 |

* cited by examiner

Primary Examiner—Darren W. Ark

(57) ABSTRACT

The invention relates to an insect vacuum trap wherein an elongated housing has a vacuum creating centrifugal impeller therein that creates a negative pressure air stream at a forward opening therein. The exhaust air of the impeller escapes through openings in the housing. A housing or chamber covers part of the openings to create a positive air pressure air stream which is guided by way of a tube toward the forward opening of the housing. Within the housing there is located a mesh basket for catching insects aspirated into the tubular housing. Within the basket there are located pellets which give off debilitating fumes which are carried forward by said positive pressure air stream to exit at the forward end of the tubular housing for the purpose of disorienting the insect and to be able to approach the same with the vacuum at the forward of the tubular housing.

13 Claims, 3 Drawing Sheets

INSECT VACUUM TRAP

BACKGROUND OF THE INVENTION

The invention pertains to a vacuum operated insect trap. The device is electrically operated and is designed to trap insects such as flies, mosquitoes, beetles, centipedes, spiders etc. Flying insects, especially flies are a nuisance in any environment such as a home, a restaurant, a meat packing plant or a grocery store. In a home various remedies are available, such a fly swatters, sticky but unsightly fly paper or spray insecticides. But in a restaurant environment, the above noted remedies cannot be used. For example, a spray insecticide cannot be used because it would otherwise contaminate the ambient air of the dining patrons. Therefore, other remedies have to be used or invented. There are known devices which are operated by a vacuum which attract the insects by a vacuum which is generated within a housing and the insects are caught within a bag or container which is supported within the housing and may be emptied whenever it is necessary to do so. The housing normally has a somewhat elongated funnel or snout. When the vacuum is operated, the elongated funnel is trained toward the insect and when the approach is close enough, the insect may be drawn into the interior of the housing and may be trapped in a bag or a container designed for that purpose.

U.S. Pat. No. 4,074,458 discloses a motorized vacuum unit that is fitted with an intake nozzle or funnel that may be readily pointed towards a fly or other sitting or flying insects to catch and draw the insect into a mesh cage inside the unit. The device disclosed in this patent makes it easy to move the hinged nozzle away from the motorized housing to gain easy access to the interior where the trap is located.

U.S. Pat. No. 4,607,451 illustrates a vacuum operated insect trap including a nozzle or a funnel that is trained toward the insect to be captured. At the lower end of this device is located a removable tank to easily access the trapped insects.

U.S. Pat. No. 4,794,725 teaches the use of a motorized insect trapping device which draws insects into its interior by way of a vacuum wherein the insects are deposited on a screen. The switch operating the electric motor is also coupled to a closure member to close the funnel once the electric power has been turned off. Included in this device is an insecticide dispenser for the trapped insects to be killed.

U.S. Pat. No. 4,918,857 discloses a vacuum entrapping device by which insects are drawn into the interior of the housing wherein the insects are trapped in a disposable insect collection cartridge. The cartridge includes a closure device and a filter device. The filter separates the insects from the negative air stream. This Patent also discloses the use of a dust collector which renders the disclosed device as a dual purpose insect trapping device or as a dust collecting device. The disclosed device also teaches the use of telescoping tubes to extend the length of the vacuum nozzle.

U.S. Pat. No. 5,052,147 teaches the use of a hand-held, battery-powered apparatus for the collection and the disposal of insects through an open end of the apparatus. The device of this Patent can be used in two modes, that is, in a first mode it is a regular vacuum cleaner, while in a second mode, the device converts to an insect trapping device by way of a simple attachment instead of a regular vacuum nozzle.

OBJECTS OF THE INVENTION

The inventive device has evolved from long studies of the behavior and tendencies of various insects resulting in many different experiments. Flies, for example, are difficult to trap by way of a vacuum unless they are in a certain location. That location would be a window where the flies tend to fly and stay against the glass because instinct makes them believe that they are flying to the outside environment. A hand-held vacuum device is easy to use because the vacuum nozzle can be moved closely to the fly to entrap the same into the negative air stream. However, it is much more difficult to trap a fly which happens to be in the open air or sitting on a flat surface such as table or a counter top, for example. Any fly is very skittish and senses the approach of a vacuum tube or nozzle whether the negative air flow is on or off and will fly off in any direction unlike a fly sitting on the glass of a window. As stated above, experiments have shown that a fly and other insects, for that matter, can be lulled into a false sense of security by an airflow that numbs their instincts to cause them to act or behave quite differently than they normally would. It has been found that the vapor emanating from moth balls has been very effective to have the above noted effect. Therefore, the inventive device includes a positive air stream that is brought or guided forward to where the negative air pressure is operating to temporarily stun or disorient the fly or the insect and thereafter to be sucked inside the housing where a porous basket is located. The positive air stream is guided just forward of where the real negative air pressure is most effective. The experiments have shown that the insects, mostly the flies, are even intrigued or duped by the vapor derived from the moth balls and have come back even if they happened to escape a first attempt to entrain the same in the negative air pressure. The inventive device includes a counter trapping device within a mesh basket, that originally caught or trapped the insects, to prevent any insects from escaping outwardly again once the vacuum device has been shut off.

DETAILED DESCRIPTION OF THE INVENTION

Figure 1:
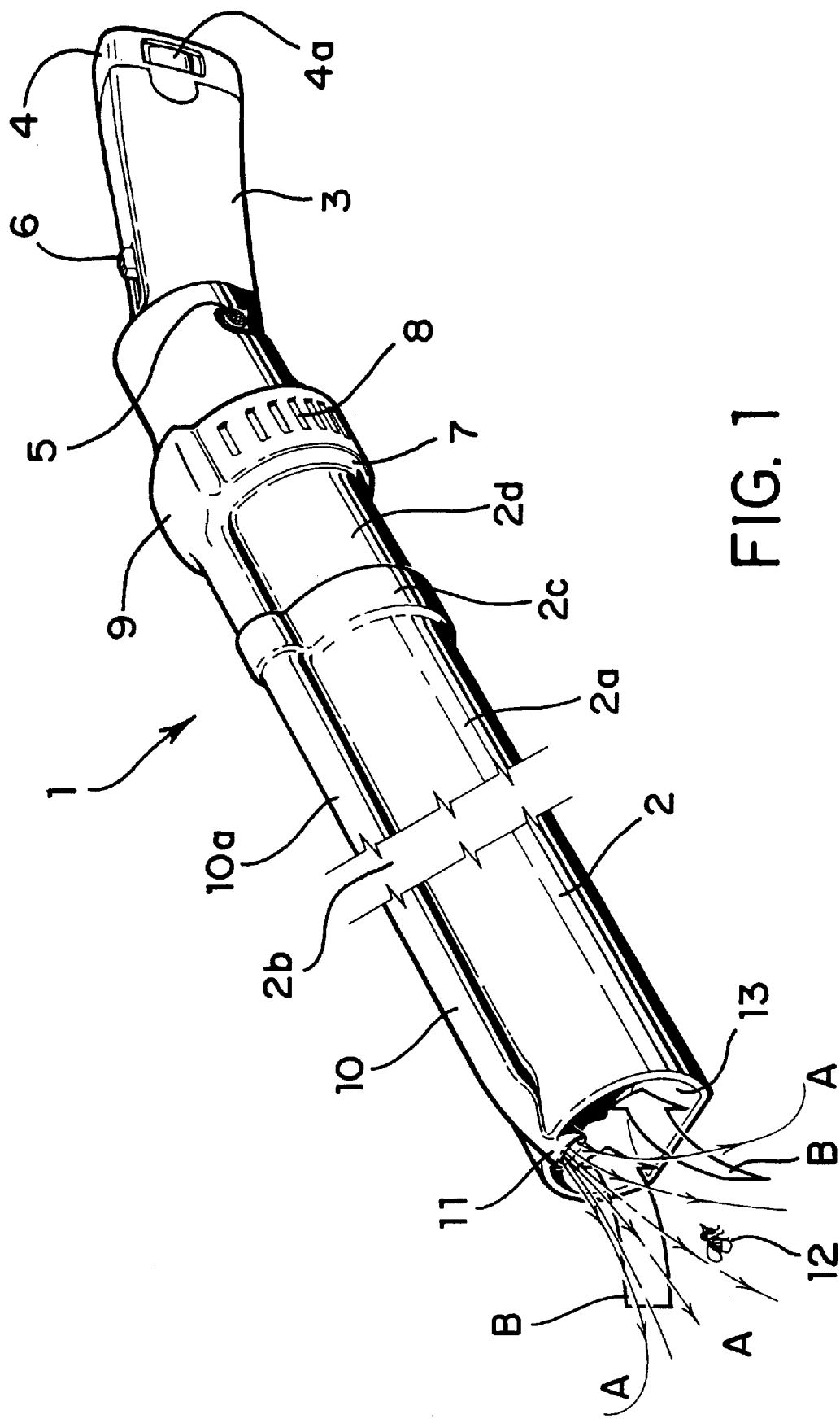
FIG. 1 is a perspective view of the overall insect trap.

The numeral 1 in FIG. 1 shows the overall appearance of the suction insect trap. Included in this insect trap is an elongated housing or tubular housing 2. The housing 2 can consist of several lengths as is indicated by 2a and the break lines 2b between the different lengths sections 2 and 2a. A longer length, for example, is desirable or even necessary when a fly is located in an inaccessible or a remote area such as a ceiling. Any one of the chosen lengths 2 or 2a is connected to the basic housing tube 2d by way of a form fit coupling 2c. The overall housing of the vacuum insect trap is handled by a handle 3 which contains the rechargeable battery pack 4 having the rechargeable terminals or contacts 4a. The battery pack 4 can be removed from the housing 3 by release button 5. An electric battery operated motor (not shown) is located within the housing 3 which is well known in hand held vacuum cleaners. The motor is operated by a two stage switch 6 on top of the handle or grip 3. The motor driven centrifugal impeller 30 (FIG. 3) is contained in the housing 7 and is driven by an electric motor and the air from the impeller is expelled through the exhaust openings 8. This operation creates a suction or a negative pressure stream of air which has its air intake at the front of the tubular housing 2 such as at 13. The mouth of the tubular housing is somewhat flattened. This will result in a somewhat wider flow of the negative pressure air. The flow of the intake air is indicated by arrows B.

On top of the impeller housing 7 there is located a relatively small exhaust pick up housing or a cap 9 which traps the air exhausting from the openings 8 and gathers the air into a positive pressure air stream which is guided forward by the tubes 10 and 10a to the end of the housing 2 and the positive pressure air steam exits at the end 11 of the tube 10. The stream of the air exiting from the mouth 11 of the tube is indicated by the arrows A. The mouth 11 of the tube 10 is slightly bent downwardly to some extent so that the exiting air stream A will somewhat overlap the other air stream B which is moving into the interior of the tube 2. The reason for this arrangement is so that the intent of the invention is that the insect (fly) 12 should be sprayed with the debilitating fumes first before it can feel or be aware of the effect of the suction (arrow B). Once the insect is stunned or disoriented, the implement or vacuum trap can be moved closer to the insect 12 so that the suction (arrows B can take effect and suck the insect into the interior of the implement.

Figure 2:
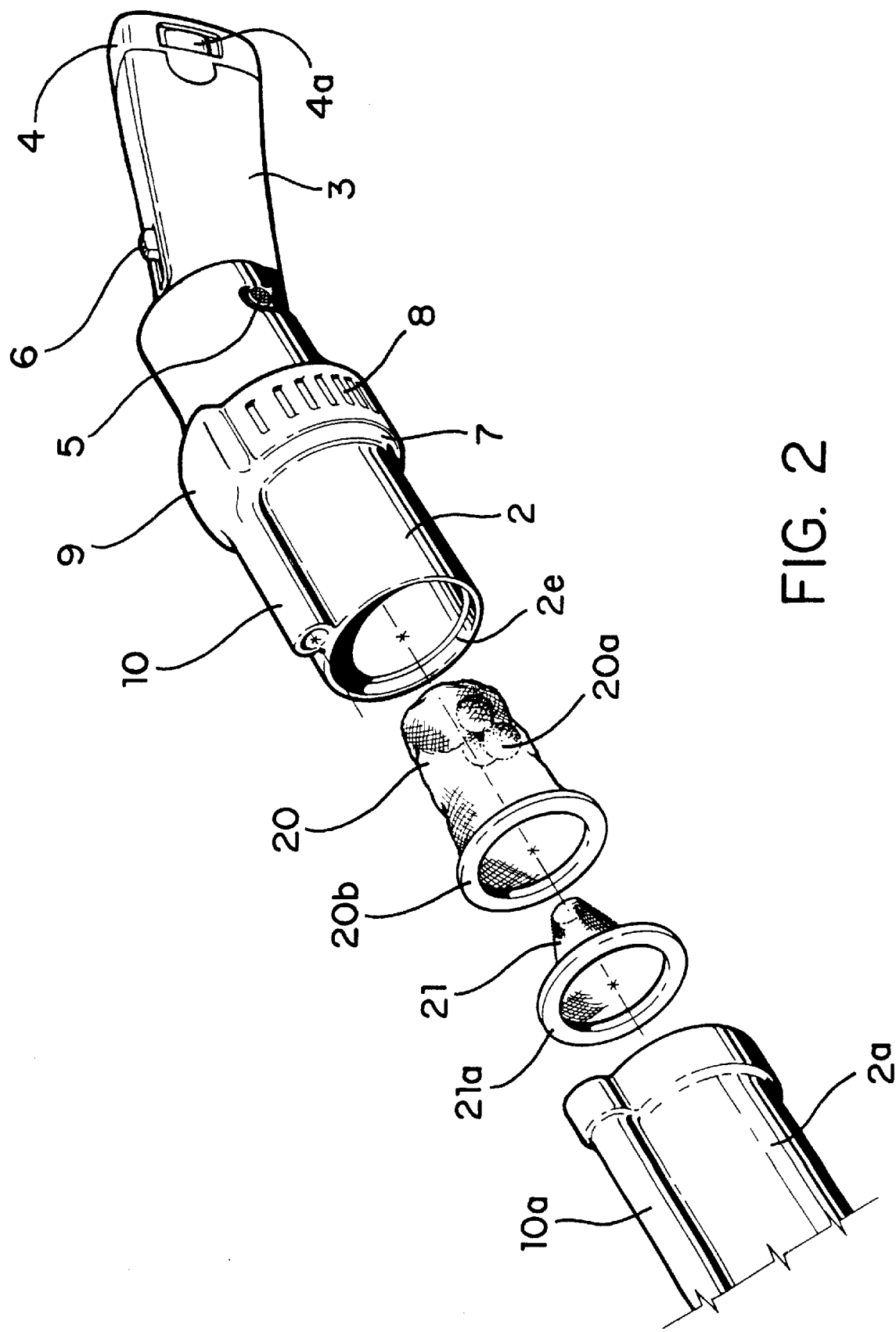
FIG. 2 is a perspective and exploded view of the inside of insect trap housing.

Turning now to FIG. 2, there is shown an exploded view of the interior of the vacuum trap. A basket 20 is inserted into the housing 2 just in front of the impeller which is creating the suction in the tube 2 through the basket 20. In the basket 20 there are located or placed therein a certain number of mothball pellets 20a. The chemical designation of such pellets is "Para dichlorobenzene". Any other pellets having the same debilitating effect on the insects (flies) may be used. Experimentation has shown and proven itself that a Nylon fabric mesh of 100 to 100 inches/square inch is most effective in trapping the insects without obstructing the flow of air through the basket itself to a considerable extent. The basket 20 has a gasket 20b so that it can snugly fit within a recess 2e of the housing 2. FIG. 2 also shows a truncated cone shaped trap 21 with its point of the cone extending into the basket 20 which prevents any insects, especially flies, escaping from the basket because such insects cannot maneuver through the pointed and freely extending opening in the cone. The cone shaped trap also has a gasket 21a which also will fit snugly within the housing recess 2e together with the basket 20 to form a tight seal therein.

Figure 3:
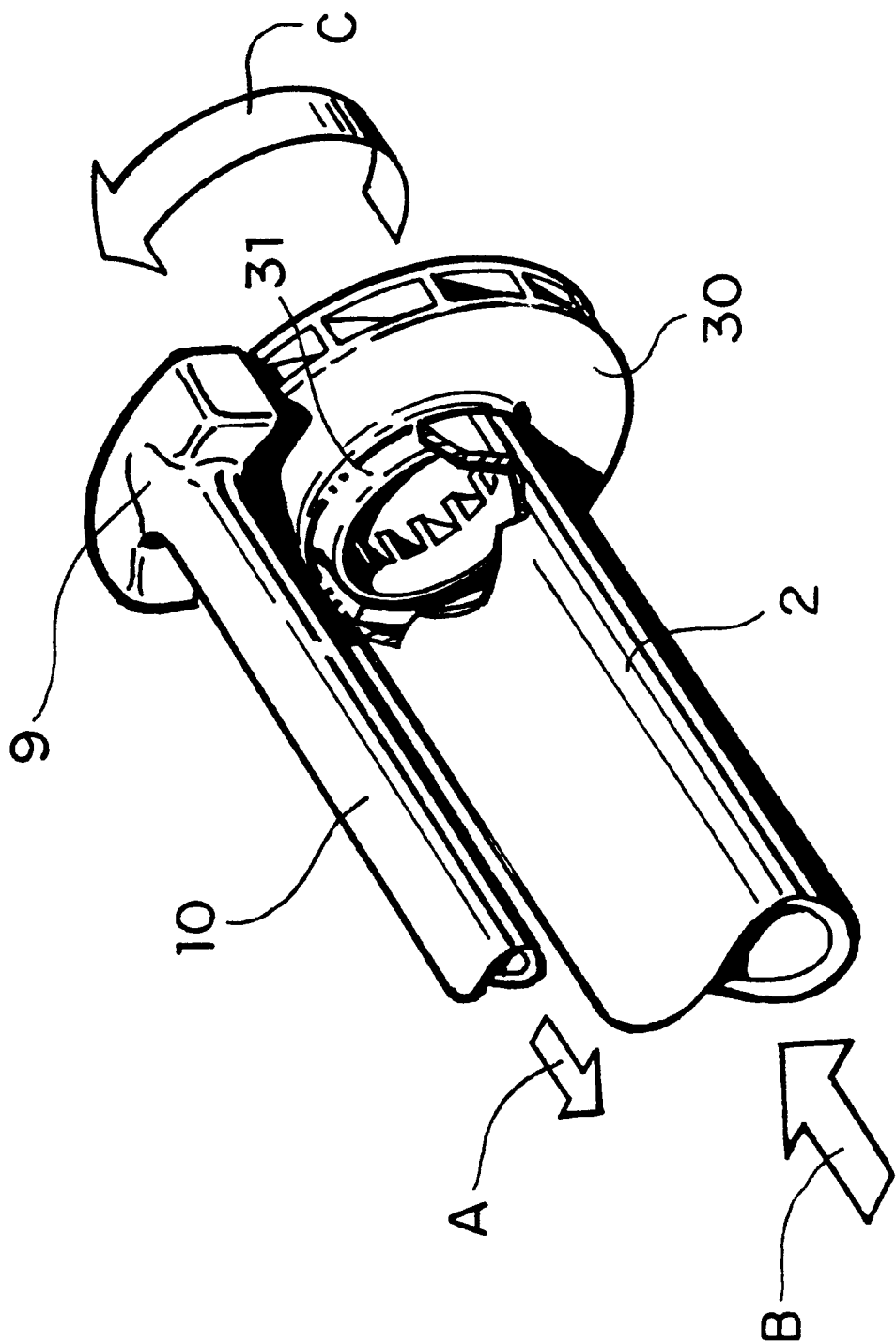
FIG. 3 is a cutaway view showing the impeller and the suction tube.

Turning now to FIG. 3, there is shown a relationship between the impeller 30 and the housing tube 2. The impeller 30 has a skirt 31 extending from a planar surface which penetrates into the suction tube 2 to some extent. This will form a more airtight formation between the impeller 30 and the tube 2 which helps to create a better suction within the tube 2. Therefore the power requirements of the motor and the battery pack can be reduced to some degree. The rotation direction of the impeller is indicated at arrow C. The suction air flow is indicated by arrow B. In the description above it was indicated that the pickup housing 9 of FIG. 1 and FIG. 3 covers only some of the impeller exhaust openings. This is designed so that the air stream A which emanates from the opening 11 of the air tube 10 has a force which is only about 25% of the force of the air stream B of the vacuum tube 2 at its opening 13. It has been found that this way the positive air pressure stream A does not overwhelm the negative air stream B. This is so because it has been found that only a faint spraying of the insect is necessary to obtain the debilitating results. It should also be noted that the spraying of mothball fumes into the general atmosphere in any given space is not desirable which in this type of an arrangement is held to a minimum.

CONCLUSION

In view of all of the above it can now be seen that a novel vacuum insect trap has been developed which works almost the time that it is being used. As stated above, the bringing forward of the debilitating fumes in a positive pressure air stream in front of the negative pressure or vacuum air stream results in the fact that the insect, particularly a fly, is stunned, disoriented or duped by way of instinct believes that there is no danger in the vicinity to make an attempt at escape. The above reality has proven itself after many experimentations by trying different air speeds both negative or positive or by trying many different debilitating fumes.

What I claim is:

1. An insect vacuum trap consisting of an elongated and tubular housing having means therein for creating a negative pressure stream of air to enter into an opening in said tubular housing, means for creating a positive pressure stream of air to exit from a separate tube having an opening located at said opening of said tubular housing, means for directing said positive pressure stream of air to overlap said negative pressure stream of air to a greater extent in its distance from said opening in said tubular housing including means for creating debilitating fumes in said positive pressure air stream to disorient insects, wherein said means for creating said negative air stream includes a centrifugal impeller driven by an electric motor located within said tubular housing, said impeller exhausts air through a multiple of exhaust openings in said housing, wherein said means for creating said positive pressure air stream comprises a chamber covering some of said exhaust openings.

2. The insect vacuum trap of claim 1, wherein said tube extends between said chamber and said opening of said tubular housing.

3. The insect vacuum trap of claim 2, wherein said chamber covers about 25% of said exhaust openings in said housing.

4. The insect vacuum trap of claim 2, wherein said tubular housing and said tube are coextensive.

5. The insect vacuum trap of claim 4, wherein said tubular housing and said tube are molded into one unit.

6. The insect vacuum trap of claim 4, wherein said tubular housing has a forward end and a rear end and said tube has a forward end and a rear end including means for coupling said forward ends and said rear ends together in a form-fit manner.

7. The insect vacuum trap of claim 6, wherein said forward ends have different lengths.

8. The insect vacuum trap of claim 2, wherein said means for creating debilitating fumes to disorient insects consists of a mesh basket located within said tubular housing in front of said impeller creating said negative air stream, said basket containing pellets giving off said fumes.

9. The insect vacuum trap of claim 8, wherein said pellets are made of para dichchlorobenzene.

10. The insect vacuum trap of claim 8, wherein said basket has a gasket at one end thereof, said gasket sealingly engages an interior recess in said tubular housing.

11. The insect vacuum trap of claim 8 including means for preventing any insects within said basket from escaping from said basket once trapped therein.

12. The insect vacuum trap of claim 11, wherein said means for preventing consists of a truncated cone of mesh fabric having its cone point directed toward an end of said basket.

13. The insect vacuum trap of claim 12 including a gasket at an end of said cone remote from said point, said gasket of said cone is coextensive with and in abutment with said gasket of said basket.

* * * * *